(12) United States Patent
Guzman et al.

(10) Patent No.: US 8,377,247 B2
(45) Date of Patent: Feb. 19, 2013

(54) SHAPED COMPOSITE STRINGERS AND METHODS OF MAKING

(75) Inventors: Juan C. Guzman, Seattle, WA (US);
Douglas A. McCarville, Orting, WA (US); Daniel M. Rotter, Lake Forest Park, WA (US); Brian G. Robins, Renton, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 12/976,070

(22) Filed: Dec. 22, 2010

(65) Prior Publication Data
US 2011/0088833 A1     Apr. 21, 2011

Related U.S. Application Data

(62) Division of application No. 11/753,482, filed on May 24, 2007, now Pat. No. 7,861,969.

(51) Int. Cl.
*B32B 37/10*     (2006.01)

(52) U.S. Cl. ........ 156/285; 156/212; 156/286; 264/510; 264/511

(58) Field of Classification Search ................ 156/285, 156/286, 381, 382, 212, 213, 215; 264/510, 264/511; 244/119, 120, 123, 123.3
See application file for complete search history.

(56) References Cited

U.S. PATENT DOCUMENTS

| | | | |
|---|---|---|---|
| 2,491,418 A | 12/1949 | Schlesman | |
| 2,630,472 A | 3/1953 | Mcarthur | |
| 3,028,292 A | 4/1962 | Hisids et al. | |
| 3,205,288 A | 9/1965 | Bates | |
| 3,390,393 A | 6/1968 | Upton et al. | |
| 3,530,021 A | 9/1970 | Reichl | |
| 3,779,487 A | 12/1973 | Ashton et al. | |
| 3,963,425 A | 6/1976 | Sambrook | |
| 4,053,667 A * | 10/1977 | Smith | ............. 428/36.1 |
| 4,079,903 A | 3/1978 | Ashton et al. | |
| 4,197,545 A | 4/1980 | Favaloro et al. | |
| 4,510,500 A | 4/1985 | Brune | |
| 4,538,780 A | 9/1985 | Roe | |
| 4,776,907 A | 10/1988 | Massions | |
| 5,170,666 A | 12/1992 | Larsen | |

(Continued)

FOREIGN PATENT DOCUMENTS

| | | |
|---|---|---|
| DE | 1949209 A1 | 4/1971 |
| EP | 0215698 A2 | 3/1987 |

(Continued)

OTHER PUBLICATIONS

Marasco et al., "Mechanical Properties Balance in Novel Z-pinned Sandwich Panels; Out-of-Plane Properties". Composites Part A: Applied Science and Manufacturing, Elsevier Science Publishers, Amsterdam, NL, vol. 37, No. 2, Feb. 2006, pp. 295-302.

(Continued)

*Primary Examiner* — Christopher Schatz
(74) *Attorney, Agent, or Firm* — Yee & Associates, P.C.

(57) ABSTRACT

A stiffened skin panel of an aircraft that includes an aircraft skin panel of composite material and a composite stringer consolidated with the aircraft skin panel. The stringer has a pair of stringer sides, each extending from a stringer top to a stringer leg. The stringer sides may each extend through a wide radius, smooth continuous curve to a stringer leg. The wide radius, smooth continuous curve may be proximate the base of the stringer side in a region where the stringer side transitions to the stringer leg.

18 Claims, 6 Drawing Sheets

U.S. PATENT DOCUMENTS

| | | | |
|---|---|---|---|
| 5,222,166 A | 6/1993 | Weltha |
| 5,242,523 A | 9/1993 | Willden et al. |
| 5,271,986 A | 12/1993 | Dublinski et al. |
| 5,332,178 A | 7/1994 | Williams |
| 5,348,601 A | 9/1994 | Ray |
| 5,363,464 A | 11/1994 | Way et al. |
| 5,415,504 A | 5/1995 | Wolf et al. |
| 5,458,330 A | 10/1995 | Baum |
| 5,527,414 A | 6/1996 | Dublinski et al. |
| 5,624,622 A | 4/1997 | Boyce et al. |
| 5,632,940 A | 5/1997 | Whatley |
| 5,854,336 A | 12/1998 | Divone, Sr. et al. |
| 5,863,635 A | 1/1999 | Childress |
| 5,958,550 A | 9/1999 | Childress |
| 6,116,179 A | 9/2000 | Swinbanks et al. |
| 6,117,376 A | 9/2000 | Merkel |
| 6,159,414 A | 12/2000 | Tunis, III et al. |
| 6,187,411 B1 | 2/2001 | Palmer |
| 6,458,309 B1 | 10/2002 | Allen et al. |
| 6,497,190 B1 | 12/2002 | Lewit |
| 6,510,961 B1 | 1/2003 | Head et al. |
| 6,529,127 B2 | 3/2003 | Townsend et al. |
| 6,632,502 B1* | 10/2003 | Allen et al. ............ 428/119 |
| 6,638,466 B1 | 10/2003 | Abbott |
| 6,653,980 B2 | 11/2003 | Ceccom et al. |
| 6,689,246 B2 | 2/2004 | Hirahara et al. |
| 6,739,861 B2 | 5/2004 | Cournoyer et al. |
| 6,755,998 B1 | 6/2004 | Reichard et al. |
| 6,889,937 B2 | 5/2005 | Simpson et al. |
| 6,949,282 B2 | 9/2005 | Obeshaw |
| 6,960,993 B2 | 11/2005 | Mattes et al. |
| 6,963,728 B2 | 11/2005 | Edwards et al. |
| 6,999,857 B1 | 2/2006 | Kasper et al. |
| 7,001,082 B2 | 2/2006 | Morrison |
| 7,018,217 B2 | 3/2006 | Marshall et al. |
| 7,063,763 B2 | 6/2006 | Chapman, Jr. |
| 7,074,474 B2 | 7/2006 | Toi et al. |
| 7,118,370 B2 | 10/2006 | Willden et al. |
| 7,159,822 B2 | 1/2007 | Grantham et al. |
| 7,205,956 B1 | 4/2007 | Sychaleun et al. |
| 7,207,523 B2 | 4/2007 | Callahan et al. |
| 7,216,832 B2 | 5/2007 | Simpson et al. |
| 7,231,180 B2 | 6/2007 | Benson et al. |
| 7,263,889 B2 | 9/2007 | Kennedy et al. |
| 7,268,517 B2 | 9/2007 | Rahmel et al. |
| 7,276,703 B2 | 10/2007 | Berkcan et al. |
| 7,277,822 B2 | 10/2007 | Blemel |
| 7,281,318 B2 | 10/2007 | Marshall et al. |
| 7,307,431 B2 | 12/2007 | Safai et al. |
| 7,343,265 B2 | 3/2008 | Andarawis et al. |
| 7,400,253 B2 | 7/2008 | Cohen |
| 7,419,627 B2 | 9/2008 | Sheu et al. |
| 7,513,769 B2 | 4/2009 | Benson et al. |
| 7,719,416 B2 | 5/2010 | Arms et al. |
| 7,749,421 B2 | 7/2010 | Callis et al. |
| 7,830,523 B2 | 11/2010 | Bommer et al. |
| 7,830,888 B2 | 11/2010 | Donovan |
| 7,861,969 B2 | 1/2011 | Guzman et al. |
| 7,864,039 B2 | 1/2011 | Georgeson |
| 7,871,040 B2 | 1/2011 | Lee et al. |
| 7,879,276 B2 | 2/2011 | Guzman et al. |
| 7,963,815 B2 | 6/2011 | Mead |
| 8,022,843 B2 | 9/2011 | Mitchell et al. |
| 8,026,257 B2 | 9/2011 | Degnan et al. |
| 8,042,767 B2 | 10/2011 | Velicki et al. |
| 8,044,812 B2 | 10/2011 | Harres |
| 8,083,182 B2 | 12/2011 | Cacciaguerra |
| 8,098,143 B2 | 1/2012 | Andarawis et al. |
| 8,115,448 B2 | 2/2012 | John |
| 8,128,030 B2 | 3/2012 | Dannenberg |
| 8,154,402 B2 | 4/2012 | Tayrani et al. |
| 2001/0017336 A1 | 8/2001 | Hirahara et al. |
| 2002/0011047 A1 | 1/2002 | Obeshaw |
| 2002/0050925 A1 | 5/2002 | Arms et al. |
| 2002/0178992 A1 | 12/2002 | Lewit |
| 2003/0098520 A1 | 5/2003 | Cournoyer et al. |
| 2003/0192990 A1 | 10/2003 | Simpson et al. |
| 2003/0216149 A1 | 11/2003 | Edwards et al. |
| 2004/0048582 A1 | 3/2004 | Mattes et al. |
| 2004/0051214 A1 | 3/2004 | Sheu et al. |
| 2004/0150529 A1 | 8/2004 | Benoit et al. |
| 2004/0166408 A1 | 8/2004 | Anderson et al. |
| 2005/0003145 A1 | 1/2005 | Toi et al. |
| 2005/0056362 A1* | 3/2005 | Benson et al. ............ 156/163 |
| 2005/0186994 A1 | 8/2005 | Rahmel et al. |
| 2005/0211843 A1 | 9/2005 | Simpson et al. |
| 2005/0213548 A1 | 9/2005 | Benson et al. |
| 2005/0259919 A1 | 11/2005 | Aldridge et al. |
| 2006/0226287 A1 | 10/2006 | Grantham et al. |
| 2007/0046298 A1 | 3/2007 | Safai et al. |
| 2007/0090294 A1 | 4/2007 | Safai et al. |
| 2007/0109121 A1 | 5/2007 | Cohen |
| 2007/0114422 A1 | 5/2007 | Berkcan et al. |
| 2007/0118335 A1 | 5/2007 | Andarawis et al. |
| 2007/0145638 A9 | 6/2007 | Mead |
| 2007/0151375 A1 | 7/2007 | Kennedy et al. |
| 2007/0176840 A1 | 8/2007 | Pristas et al. |
| 2008/0036617 A1 | 2/2008 | Arms et al. |
| 2008/0089087 A1 | 4/2008 | Stoner |
| 2008/0111024 A1 | 5/2008 | Lee et al. |
| 2008/0157429 A1 | 7/2008 | Callis et al. |
| 2008/0185478 A1 | 8/2008 | Dannenberg |
| 2008/0226876 A1 | 9/2008 | Roth |
| 2008/0290214 A1 | 11/2008 | Guzman et al. |
| 2009/0057487 A1 | 3/2009 | Velicki et al. |
| 2009/0058361 A1 | 3/2009 | John |
| 2009/0101756 A1 | 4/2009 | Cacciaguerra |
| 2009/0108211 A1 | 4/2009 | Bommer et al. |
| 2009/0127393 A1 | 5/2009 | Guzman et al. |
| 2009/0184877 A1 | 7/2009 | Bommer |
| 2009/0243895 A1 | 10/2009 | Mitchell et al. |
| 2009/0325628 A1 | 12/2009 | Becker |
| 2010/0114383 A1 | 5/2010 | Rosca et al. |
| 2010/0129589 A1 | 5/2010 | Senibi et al. |
| 2010/0141377 A1 | 6/2010 | Andarawis et al. |
| 2010/0176939 A1 | 7/2010 | Harres |
| 2010/0231382 A1 | 9/2010 | Tayrani et al. |
| 2010/0318243 A1 | 12/2010 | Lewis et al. |
| 2011/0018686 A1 | 1/2011 | Fahley et al. |
| 2011/0027526 A1 | 2/2011 | McCarville et al. |
| 2011/0080057 A1 | 4/2011 | Bowman et al. |
| 2011/0111183 A1 | 5/2011 | Guzman et al. |
| 2011/0139932 A1 | 6/2011 | Matheson et al. |
| 2011/0188862 A1 | 8/2011 | Fuss et al. |
| 2011/0254267 A1 | 10/2011 | Marengo |

FOREIGN PATENT DOCUMENTS

| | | |
|---|---|---|
| GB | 1522432 A | 8/1978 |
| JP | 4329125 A | 11/1992 |
| JP | 2005291708 | 10/2005 |
| WO | 8601039 A1 | 2/1986 |
| WO | WO2004102056 | 11/2004 |
| WO | 2005096571 A1 | 10/2005 |
| WO | 2005105402 A | 11/2005 |
| WO | WO2007041256 | 4/2007 |
| WO | 2008010841 A1 | 1/2008 |
| WO | WO2008076020 | 6/2008 |
| WO | WO2009023346 | 2/2009 |
| WO | WO2009055218 | 4/2009 |
| WO | 2010040004 A1 | 4/2010 |
| WO | WO2010065330 | 6/2010 |
| WO | WO2010144248 | 12/2010 |
| WO | WO2011011110 | 1/2011 |
| WO | WO2011016931 | 2/2011 |

OTHER PUBLICATIONS

Seibert et al., "Applications for PMI Foams in Aerospace Sandwich Structures", Reinforced Plastics, Elsevier Advanced Technology, NY, vol. 50, No. 1, Jan. 2006, pp. 44-48.

"Communication and Power Through Structural Airframe Stringers for On-board Wireless Sensors", pp. 1-10, retrieved Jun. 18, 2009. https://sqi-pw-01.nw.nos.boeing.com/structures/StratProjects/bp1_12_18_08/BTEC2009WirelessBusDraft12.17.09.pdf.

USPTO Office Action for U.S. Appl. No. 11/753,482 dated Mar. 31, 2010.

USPTO Final Office Action for U.S. Appl. No. 11/753,482 dated Jul. 19, 2010.
USPTO Notice of Allowance for U.S. Appl. No. 11/753,482 dated Sep. 7, 2010.
USPTO Office Action for U.S. Appl. No. 11/937,006 dated Dec. 30, 2009.
USPTO Final Office Action for U.S. Appl. No. 11/937,006 dated Jun. 22, 2010.
USPTO Notice of Allowance for U.S. Appl. No. 11/937,006 dated Oct. 6, 2010.
PCT Search Report dated Mar. 8, 2010 for applicant The Boeing Company, application No. PCT/US2009/065195, 13 pages.
Greenhalgh et al., "The assessment of novel materials and processes for the impact tolerant design of stiffened composite aerospace structures", Composites: Part A 34, Copyright 2003, pp. 151-161.
O'Brien et al., "Assessment of Composite Delamination Self-Healing via Micro-Encapsulation", Proceedings of American Society for Composites 23rd Technical Conference, Sep. 2008, 18 pages.
USPTO supplemental notice of allowance dated Oct. 13, 2010 regarding U.S. Appl. No. 11/753,482 4 pages.
Amendment with RCE dated Aug. 13, 2010 regarding U.S. Appl. No. 11/753,482 20 pages.
Response to office action dated Apr. 26, 2010 regarding U.S. Appl. No. 11/753,482 9 pages.
Preliminary amendment dated May 31, 2007 regarding U.S. Appl. No. 11/753,482 9 pages.
USPTO office action dated Oct. 31, 2011 regarding U.S. Appl. No. 13/005,786 26 pages.
USPTO office action dated Nov. 10, 2011 regarding U.S. Appl. No. 12/508,281 46 pages.
USPTO notice of allowance dated Oct. 6, 2010 regarding U.S. Appl. No. 11/937,006 12 pages.
Response to office action dated Mar. 30, 2010 regarding U.S. Appl. No. 11/937,006 21 pages.
Response to final office action dated Sep. 20, 2010 regarding U.S. Appl. No. 11/937,006 6 pages.
USPTO non-final office action dated Nov. 10, 2011 regarding U.S. Appl. No. 12/508,281 46 pages.
Preliminary amendment dated May 31, 2007 regarding U.S. Appl. No. 11/753,482 5 pages.
Response to office action with request for RCE dated Aug. 13, 2010 regarding U.S. Appl. No. 11/753,482 17 pages.
USPTO notice of allowance dated Oct. 13, 2010 regarding U.S. Appl. No. 11/753,482 11 pages.
USPTO final office action dated Nov. 2, 2011 regarding U.S. Appl. No. 12/277,483 12 pages.
USPTO non-final office action dated Feb. 24, 2012 regarding U.S. Appl. No. 11/753,482 19 pages.
USPTO non-final office action dated May 31, 2011 regarding U.S. Appl. No. 12/277,483 29 pages.
Response to office action dated Aug. 30, 2011 regarding U.S. Appl. No. 12/277,483 17 pages.
USPTO non-final office action dated Oct. 31, 2011 regarding U.S. Appl. No. 13/005,786 26 pages.
Partridge et al., "Advanced Polymeric Materials: Structure Property Relationships", Chapter 3, CRC Press, Apr. 2003, pp. 98-137.
PCT Search for application PCT/US2010/040668 dated Feb. 17, 2011.
U.S. Appl. No. 12/508,281, filed Jul. 23, 2009, Fahley et al.
U.S. Appl. No. 12/534,356, filed Aug. 3, 2009, McCarville et al.
U.S. Appl. No. 12/484,151, filed Jun. 12, 2009, Lewis et al.

Ko, "The future of sensor and actuator systems", Sensors and Actuators, Elsevier Sequoia S.A. Lausanne, CH vol. 56 No. 1, Aug. 1, 1996, pp. 193-197.
PCt Search Report for application PCT/US2010/036130 dated Mar. 1, 2011.
"How about this? Avionics would go in plane's skin", Electronics, VNU Business Puyblications, New York, US, vol. 60, No. 21, Oct. 15, 1987.
PCT Search Report for application PCT/US2010/036082 dated Nov. 18, 2010.
USPTO Notice of Allowance dated Dec. 2, 2010 for U.S. Appl. No. 11/937,006, 4 pages.
USPTO Office Action dated Jan. 4, 2011 for U.S. Appl. No. 12/016,018, 9 pages.
USPTO Office Action dated Jul. 9, 2010 for U.S. Appl. No. 12/016,018, 6 pages.
USPTO Notice of Allowance dated Jun. 27, 2011 for U.S. Appl. No. 12/016,018, 7 pages.
USPTO Office Action dated May 7, 2012 for U.S. Appl. No. 12/484,151, 38 pages.
USPTO Final Office Action dated May 9, 2012 for U.S. Appl. No. 12/508,281, 43 pages.
USPTO Office Action dated Jun. 7, 2012 for U.S. Appl. No. 12/534,356, 34 pages.
USPTO Office Action dated Feb. 24, 2012 for U.S. Appl. No. 12/277,483, 19 pages.
USPTO Office Action dated Feb. 23, 2010 for U.S. Appl. No. 11/925,622, 19 pages.
USPTO Notice of Allowance dated Jul. 12, 2010 for U.S. Appl. No. 11/925,622, 6 pages.
USPTO Final Office Action dated Jul. 13, 2012 for U.S. Appl. No. 13/005,786, 7 pages.
PCT Search Report dated Apr. 23, 2009 regarding international application No. PCT/US2008/064427, 3 pages.
PCT Search Report dated Jun. 16, 2009 regarding international application No. PCT/US2008/078438, 6 pages.
EPO Search Report dated Jul. 15, 2011 regarding application No. 09756924.8-2124 (PCT/US2009065195), applicant's reference NAM/P116420EP00, applicant The Boeing Company, 8 pages.
Abbasi et al., "Microwave Nondestructive Detection of Longitudinal Cracks in Pipe with U-bend and Prediction of its Location by Signal Processing", Electromagnetic Nondestructive Evaluation, vol. 31, Oct. 2008, pp. 154-161 (Abstract).
Caspers et al., "Waveguide Mode Reflectometry for Obstacle Detection in the LHC Beam Pipe Including Signal Attenuation", Proceedings of the 2003 Particle Accelerator Conference, vol. 4, No. 12, May 2003, pp. 2700-2702.
Hatfield et al., "Electromagnetic Reverberation Characteristics of a Large Transport Aircraft", Naval Surface Warfare Center Dahlgren Division, NSWCDD/TR-93/339, Jul. 1994, 95 pages.
Hladio et al., "A passive wireless displacement sensor for structural health monitoring of civil structures", Proceedings of SPIE Nondestructive Characterization for Composite Materials, Aerospace Engineering, Civil Infrastructure, and Homeland Security 2007 SPIE US, vol. 6531, Apr. 2007, pp. 653114 (Abstract).
Hill et al., "Aperture Excitation of Electrically Large, Lossy Cavities", IEEE Transactions on Electromagnetic Compatibility, vol. 36, No. 3, Aug. 1994, pp. 169-178.
Shibata et al., "Experimental study on NDT method using electromagnetic waves", Journal of Materials Processing Technology, vol. 161, No. 1-2, Apr. 2005, pp. 348-352 (Abstract).

* cited by examiner

SHAPED COMPOSITE STRINGERS AND METHODS OF MAKING

CROSS-REFERENCED TO RELATED APPLICATION

This application is a divisional of application Ser. No. 11/753,482, filed on May 24, 2007, status allowed.

BACKGROUND INFORMATION

1. Field

The embodiments described herein generally relate to aircraft stringers, and more particularly, relate to shaped composite stringers and methods of making these.

2. Background

Aircraft generally include an airframe, which may be regarded as an underlying skeleton, to which skin panels are attached to form a smooth aerodynamic outer surface. The wings also include underlying structure covered with skin panels. Typically, skin panels are light and thin to minimize the weight of the aircraft and increase its payload and range. Since skin panels are thin, they are generally flexible and require stiffening to prevent undesired movement, flexing and vibration during flight.

Figure 1:
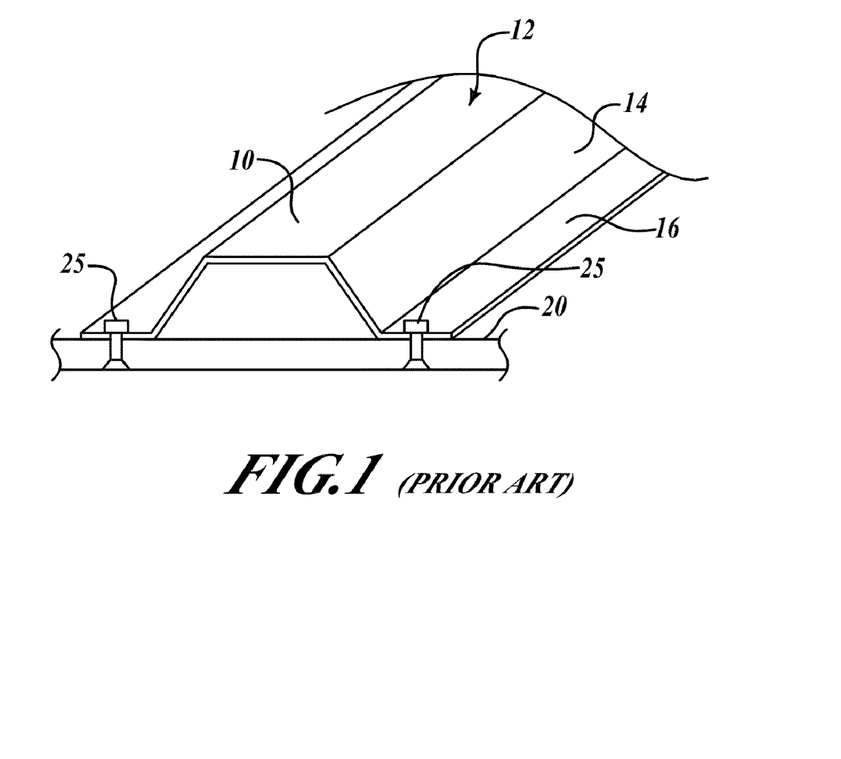
FIG. 1 is a perspective view of a prior art hat stringer attached to an aircraft skin panel.

Eat stringers have been used for decades in the aerospace industry for stiffening metal fuselage sections and metal wing skins on both commercial and military aircraft. These stringers are formed of thin metal panel with acute angles that result in a trapezoidal shape. Relatively simple metal-forming techniques are used to bend the metal into the acute angles required for this shape. These metal forming techniques include brake forming or rolling the metal into the hat stringer shape. These techniques allow the production of hat stringers with tight, constant angular bends and straight or flat legs. In FIG. 1, for example, a hat stringer 10 is attached to a fuselage skin panel 20 by a series of fasteners 25 (two shown) that are attached at intervals along the leg 16 of the hat stringer 10. The hat stringer 10 is trapezoidal having a flat upper surface 12 and sloping sides 14 that are at an angle to the legs 16, which are substantially aligned with the flat upper surface 12. The intersection between sides 14 and legs 16 may be characterized as sharp, tight or having a small radius of curvature.

Composite materials that include a resin matrix and filler have found increasing application in the aerospace industry because of their relatively light weight and favorable physical properties. In general, the fillers may be reinforcing or non-reinforcing in nature and may be in a variety of shapes, for example, powders, particulates, fibers tapes of unidirectional fibers, woven fabrics, and the like. The resins are organic polymeric materials that may include for example the commonly used epoxy resins.

As composite materials (e.g., carbon fiber and epoxy matrix resin) became more prevalent in the industry for fuselage skin and wing skin panels, hat stringers remained popular for a variety of reasons. For example, while hat stringers can be made from a single stack of material, other less common shapes such as I-shaped, J-shaped, or T-shaped stiffeners require the combination of multiple stacks and radius fillers.

As stringers transitioned from metallic materials to composites, modifying the stringer shape from the straight legs and tight bends of hat stringers was not a high priority. This is largely because the structural performance of traditional hat shapes is well understood and because when creating tools in which composite hats can be cured, straight or flat shapes with relatively small radii details are simpler to manufacture.

Figure 2:
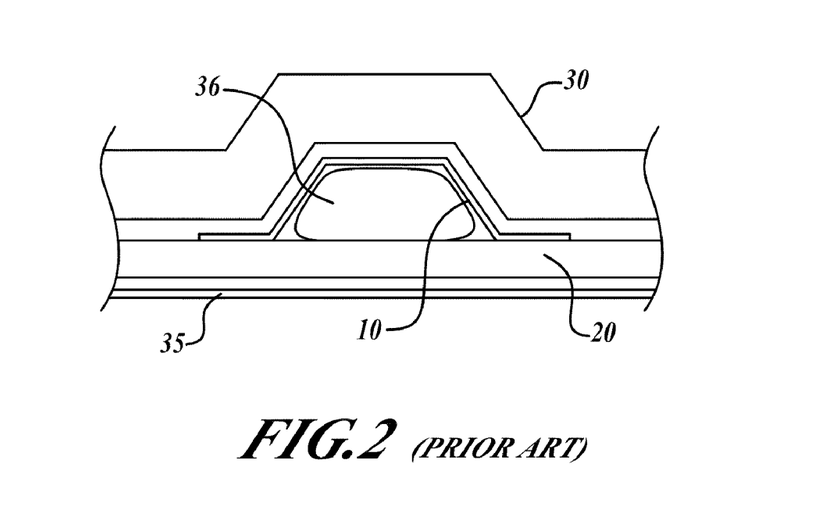
FIG. 2 is a schematic end view depicting a prior art inside mold line lay up using an inflatable bladder and caul sheet.

Composite hat stringers are now used extensively in certain commercial transport aircraft. An example of a process for attaching composite stringers to a fuselage section is illustrated in FIG. 2. A hat stringer 10 rests on fuselage skin which is backed by a semi-rigid caul sheet 35. The interior of the hollow hat stringer 10 has an inflatable rubber bladder 36, and the exterior of the hat stringer 10 is covered by an inside mold line (IML) tool. The bladder 36 is inflated while the IML tool provides outside pressure on the hat stringer 10. Thus, the hat stringer 10 is consolidated to the fuselage skin 20 by pressure of the IML tool 30 (and the bladder 36) and curing of resin, while the caul sheet 35 controls the contour of the fuselage skin 20.

This IML fabrication method requires flawless performance of several steps. For example, the composite material must be precisely located in the IML tool cavities to avoid over or under stuffing gaps. The bladders must inflate during cure to apply compaction and cure pressure. The caul sheet must be flexible enough to account for variations in material thickness and/or ply mislocation while at the same time being sufficiently rigid to create a smooth aerodynamic surface.

Figure 3:
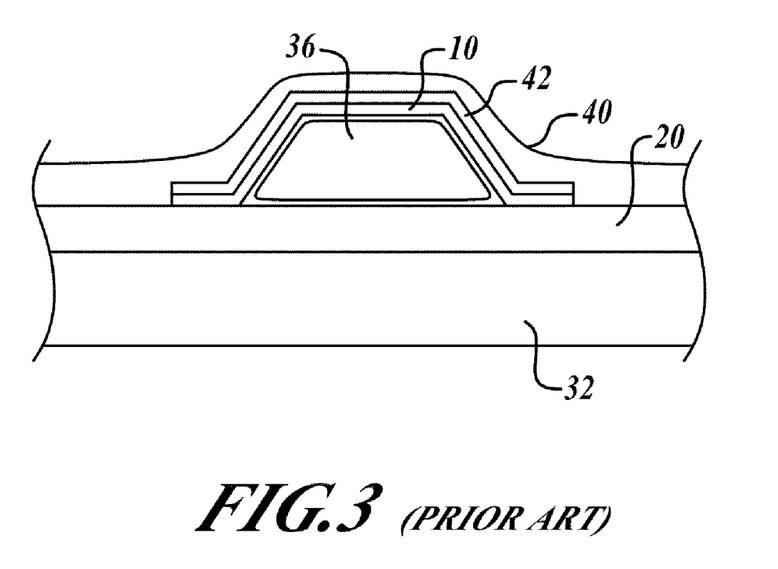
FIG. 3 is a schematic end view of a prior art outside mold line lay up using a caul panel and an inside bladder.

An OML (outside mould line) cure process is shown in FIG. 3. These cauls panels 42, shaped like the hat stringers 10, assist in forcing the composite material into the radius during the cure cycle and in smoothing out irregularities. Thus, the fuselage skin 20 is backed by an outside mold line tool (OML) 32 and the hat stringer 10 rests on the fuselage 20, with a bladder 36 in its interior. A caul panel 42 conforming to the exterior shape of the hat stringer 10 rests on the stringer 10. A bag 40 envelopes at least the caul panel 42 and the upper surface of the fuselage skin 20. A vacuum is pulled on the bag 40 while bladder 36 is inflated and pressure is applied via IML tool 32 to consolidate the hat stringer 10 to the fuselage as the resin cures to bond the composite fuselage skin to the composite stringer 10. This caul panel-assisted co-cure method requires the fabrication and use of hundreds of uniquely designed, high maintenance, cauls and associated master tools which imposes a significant cost burden.

Accordingly, it is desirable to develop composite stringers and methods of making these that simplify processes and reduce costs. In addition, it is desirable that the composite stringers have large radii to facilitate forming the stringer out of a composite blank. Further, the stringer shapes should perform as well, or better, structurally (e.g., resist column buckling and four-point bending) than traditional trapezoidal shaped hats, when made with composite materials. In addition, there is a need for methods of making composite stringers that have smooth and gentle (larger) radii of curvature near the stringer base and that eliminate the need to use caul sheets to assist the co-cure of stringer to panel. Furthermore, other desirable features and characteristics of the composite stringers will become apparent from the subsequent detailed description and the appended claims, taken in conjunction with the accompanying drawings and the foregoing technical field and background.

SUMMARY

An exemplary embodiment provides a stiffened skin panel of an aircraft that includes an aircraft skin panel of composite material and a composite stringer consolidated with the aircraft skin panel. The stringer has a pair of stringer sides that each extend from a stringer top to a stringer leg. The stringer sides each curve smoothly and continuously through a wide radius curve to the stringer leg.

Another exemplary embodiment provides a stiffened panel of composite material and a composite stringer consolidated with the panel. The stringer has a pair of stringer sides, each stringer side extending from a stringer top to a stringer leg. An attachment zone includes a portion of the stringer and a portion of the panel proximate stringer point of attachment to the panel. The attachment zone is substantially free of broken or separated filler of the stringer composite material.

A further example of an embodiment provides a method of stiffening a composite panel with a stringer. The method includes the steps of determining the location and spacing of stringers on a composite panel to be stiffened and positioning the composite panel on a mold tool. It further includes laying down forms conforming to the shapes of the stringers to be formed on the composite panel, at determined locations and intervals. Further the method includes preparing lay ups of composite material for forming into stringers; laying the prepared lay up of composite material over each of the forms; and enclosing at least the composite panel and lay up-covered forms with a vacuum bag. The stringers are consolidated to the composite panel under heat and pressure to produce a stiffened composite panel. The produced panel is characterized in that the stringers each have a pair of stringer sides that extend smoothly through a wide radius, continuous curve to a stringer leg.

BRIEF DESCRIPTION OF THE DRAWINGS

Various embodiments will hereinafter be described in conjunction with the following drawing figures, which are not to scale and which may be schematic in nature, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Exemplary embodiments provide improved stringer structure and consolidation with a panel to be stiffened. By reconfiguring the stringer shape so that the tight radii are eliminated, embodiments provide a smooth shape with large radius curvature, at least where the stringer sides merge into the stringer legs. The sides of the stringer may have an inflexion point that is a smooth transition point. The composite material used to form the stringer drapes naturally to conform to the smooth shape. The contouring is sufficiently smooth and gradual (i.e., without sharp transitions and tight radii) that it permits the use of tape plies instead of fabric, resulting in significant weight savings. Structural integrity is maintained without impairment of stringer performance.

In general, some of the exemplary embodiments of the stringers have sides that include an intermediate zone that in turn includes an inflexion point where the curvature of the stringer side transitions smoothly from a convex curve to a concave curve or from a concave curve to a convex curve. The term "smooth" as it relates to the curvature of the stringer means transitioning from a straight line to a curve at a tangent point to the curve or from one curve to another curve at a mutual tangent point. The term "continuous as it pertains to curves, means there are no discontinuities in the smooth curvature and no sharp bends or kinks. The intermediate zone may be located along the stringer side proximate the center of the stringer (with reference to stringer height) or proximate the lower end or upper end of the stringer side. Exemplary embodiments of the stringers are symmetrical on either side of a vertical center line, as shown in FIGS. 5-9, for example, and as described below.

Exemplary embodiments allow the fabric to drape to shape via its natural path based on its own inherent flexibility. This simplifies the fabrication process. Tape or fabric is applied over a shaped cure-mandrel without need for a stringer preforming operation, as is required for the tight radii of the traditional trapezoid hat stringer. The cure mandrel used with these special shaped stringers may be selected from a variety of materials and may include for example a mandrel of a flyaway material (i.e., low density foam which eliminates the need for inflation bladders), an inflatable rubber bladder, or a removable solid or hollow mandrel. Foam mandrels may be selected based on specific performance properties such as, acoustical attenuation, flame retardation and structural load carrying capability. By increasing the load carrying capability of the stringer through unique shaping, the cross sectional area may be reduced and weight savings may be realized.

Figure 4:
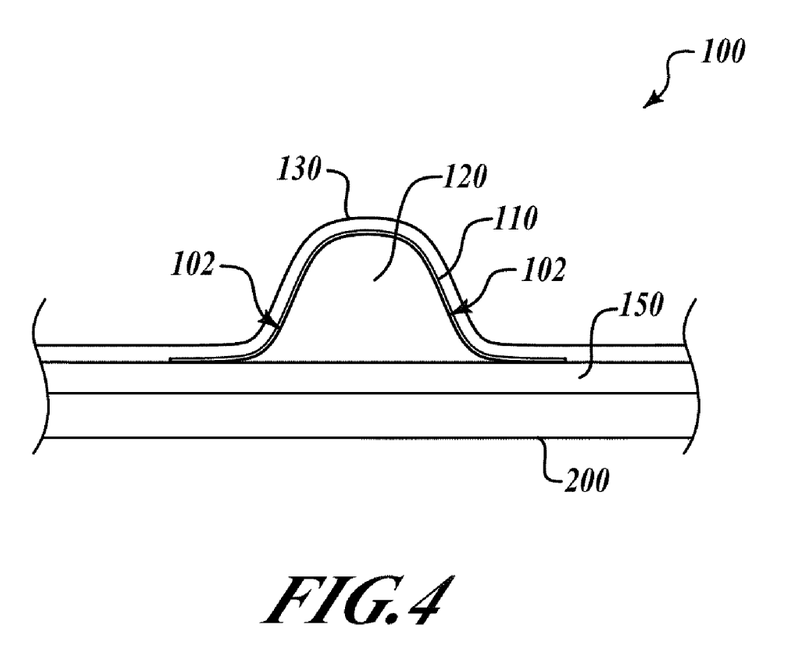
FIG. 4 is a schematic end view of an exemplary embodiment of a lay up using an OML tool to fabricate a shaped composite stringer.

FIG. 4 is an exemplary embodiment of a lay up 100 that includes an OML tool 200 which supports the underside of an aircraft skin panel 150, such as a fuselage or wing panel. A mandrel or inflatable bladder 120 rests on the upper surface of the aircraft skin panel 150, and flexible composite plies 110 are draped over the mandrel or bladder 120. A vacuum bag 130 envelopes at least the ply-draped mandrel or bladder 120 to apply pressure to the press the plies 110 to the mandrel or bladder 120 when a vacuum is pulled on the bag 130. Because of the gradual smooth curves formed by draping of plies 110, the exemplary embodiment has no sharp or tight angles and has an inflexion point 102 along sides of the stringer to be formed when the plies 110 are cured. When the plies 110 are consolidated to the aircraft skin panel 150 by pressure and co-curing of plies 110 and skin panel 150, the stringer 300 formed (FIG. 6) from plies 110 is smoothly curved and the legs 308 of the stringer extend from the sides 304 of the stringer 300 in a smooth curve devoid of any sharp turns, "kinks" or tight angles. Stringer 300 may be characterized as parabolic or bell-shaped.

The "attachment zone" of a composite stringer to a skin panel means the most inboard (relative to the stringer) zone where the stringer attaches to the panel, which is also known as the flange. The exemplary embodiments presented here that have smooth, wide radius, continuous, curvature from stringer side to stringer leg minimize or eliminate any potential for ply breakage, separation from a main body of filler (e.g., woven fabric or tape) and also minimizing excess resin accumulation.

A non-limiting group of further exemplary embodiments of composite stringer shapes are illustrated in FIGS. 5-9. Other shapes are, of course, also possible and within the scope of the presently disclosed technology.

Figure 5:
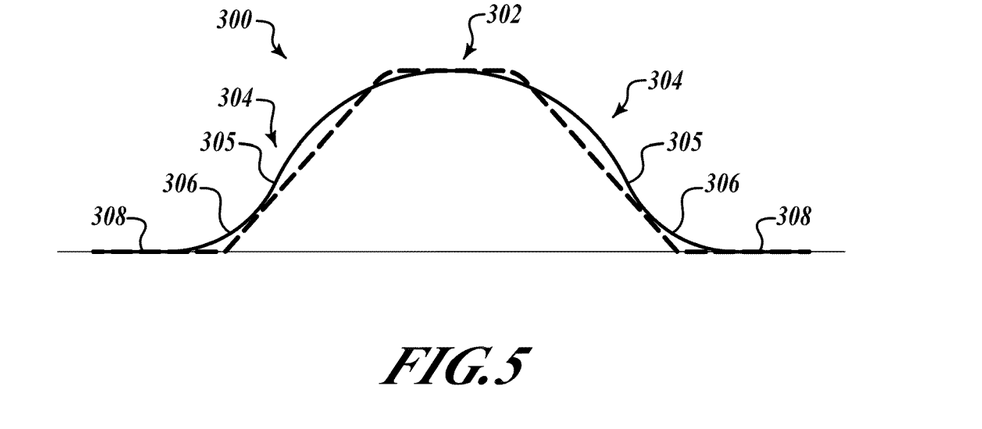
FIGS. 5-9 illustrate a non-limiting list of exemplary embodiments of composite stringer shapes in end view.

In FIG. 5, stringer 300 is substantially parabolic in shape and has a rounded top 302 curving downward to sides 304 in a convex curve. The sides 304 transition from the rounded top 302 at tangent points 305 to the curvature of the top 302 and then descend in a straight line before a transition at the tangent point of a wide radius curve 306 to the stringer legs 308.

Figure 6:
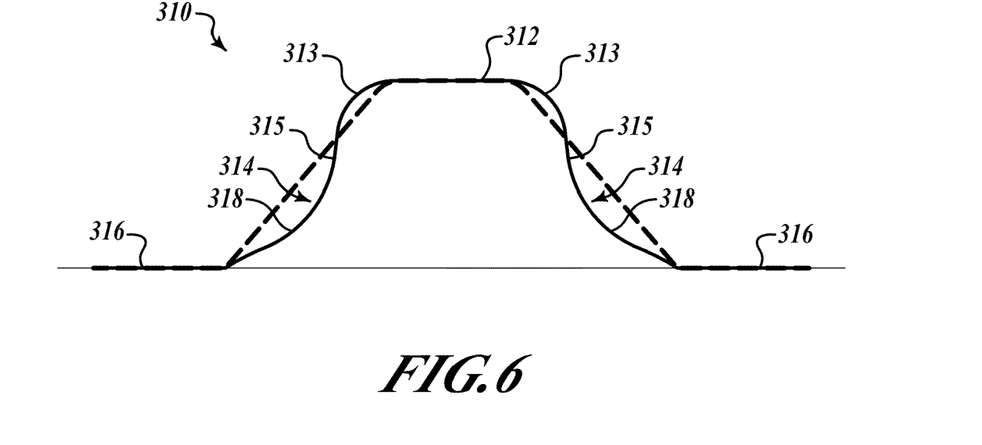

Stringer 310 shown in FIG. 6 has a substantially flat top 312 with rounded curves 313 leading to sides 314 that extend smoothly downward, substantially vertically. Each of the sides 314 in this example form an inflexion point 315. The lower ends of sides 314 curve through a large radius turn 318 and extend to legs 316.

Figure 7:
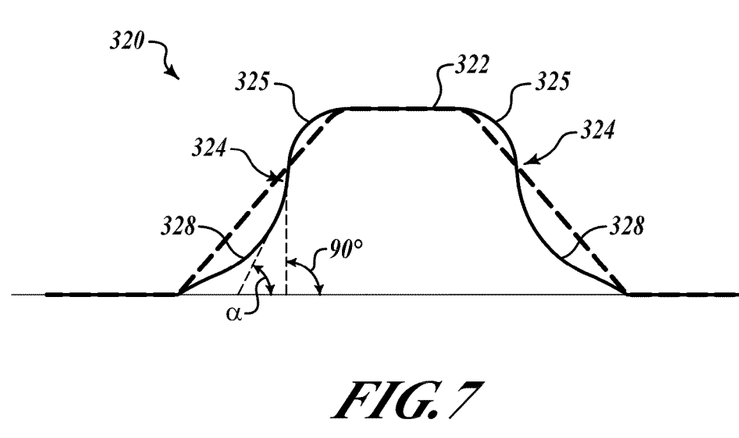

Stringer 320 shown in FIG. 7 may be characterized as substantially bell-shaped and also has a substantially flat top 322 with rounded extremities 325 extending to sides 324 that extend downward and curve through a large radius turn 328 to legs 326. As indicated, sides 324 may extend straight downward at a 90° angle to at and angle α that may range from about 90 to about 45°.

Figure 8:
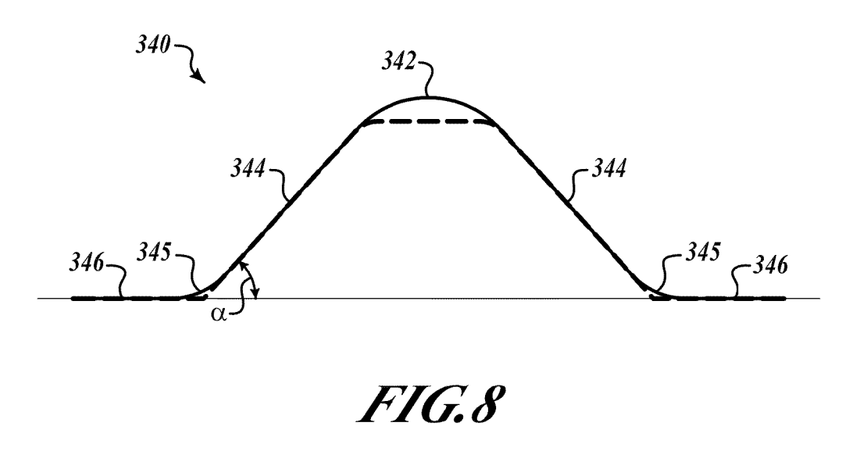

Stringer 340 shown in FIG. 8 has a rounded top 342 and is substantially parabolic or bell-shaped. The rounded top 342 extends smoothly in a convex curvature to sides 344 that spread outward as they extend downward. The sides 344 then extend through a wide angle curve 345 to form legs 346. The angle α, as indicated, may range from about 35 to about 65°.

Figure 9:
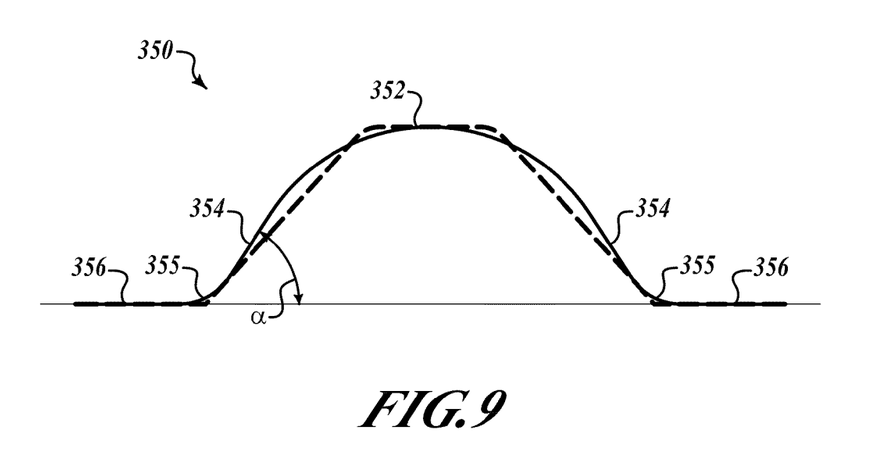

Stringer 350 shown in FIG. 9 has a rounded top 352 and is substantially parabolic or bell-shaped and has a rounder overall shape with shorter straight sides than stringer 340 of FIG. 8. The rounded top 352 extends smoothly in a convex curvature to sides 354 that spread outward as they extend downward. The sides 354 then extend through a wide angle curve 355 to form legs 356. The angle α, as indicated, may range from about 35 to about 65°.

From the foregoing examples, it is apparent that many composite stringer shapes are possible and within the scope of the presently disclosed technology, provided that these shapes include a smooth, wide-radius transition from the stringer sides to the stringer legs (and in some instances also from the stringer top to the stringer sides) that minimizes or eliminates the potential for excess resin accumulation at the transition point, fiber parting, delamination, fiber wrinkling, waviness or marcelling (in-plane waviness) and porosity in the matrix resin.

Because exemplary embodiments of the stringers have smooth shapes (at least where the stringer sides merge into the stringer legs and merge into the stringer top), it is possible to use tape plies with these embodiments rather than fabric prepregs. Tape plies have each ply of the tape in a single plane. The orientation of plies in the tape permits the use of a series of optimally oriented tapes to form stringers. The use of tape plies reduces material costs and offers potential for weight reduction.

Figure 10:
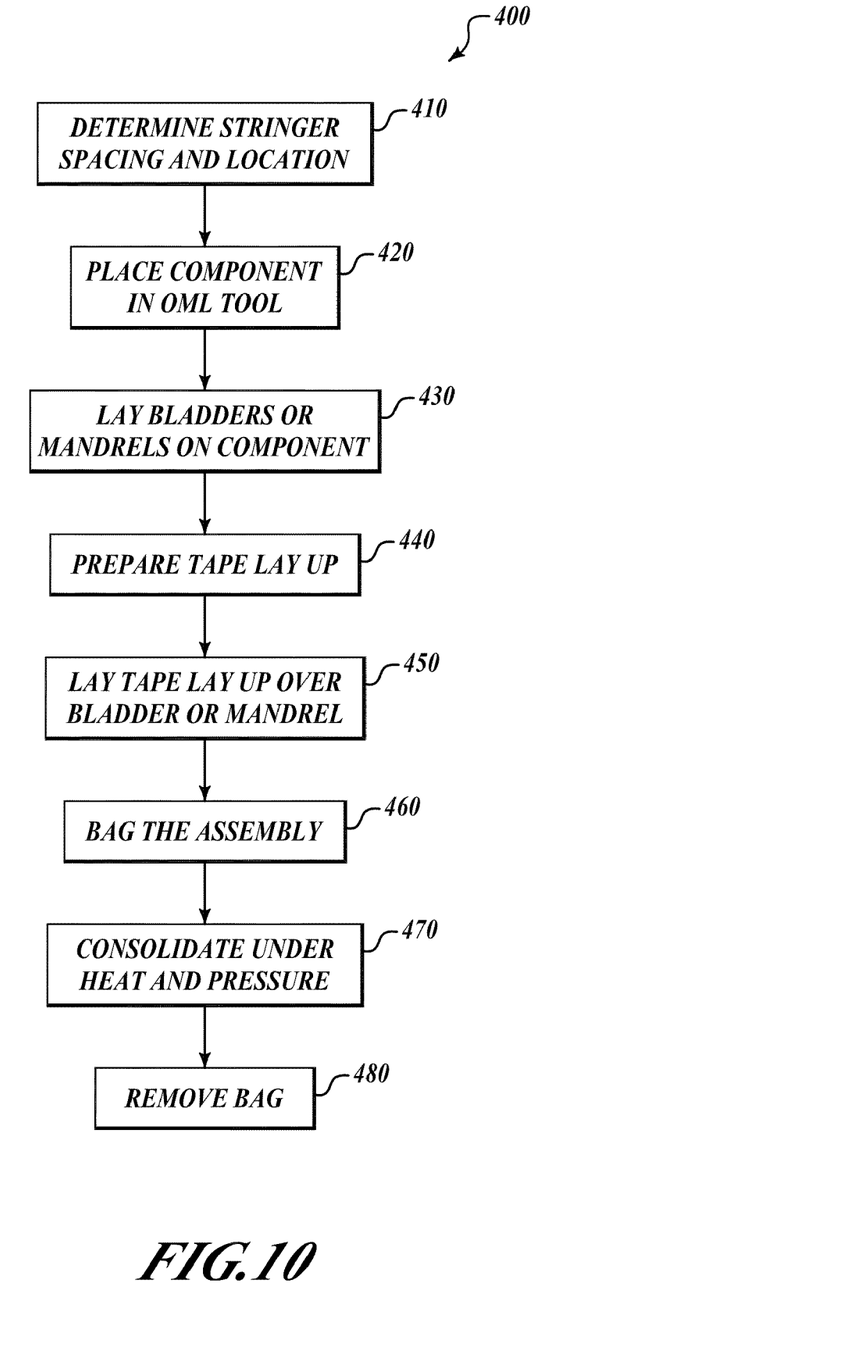
FIG. 10 illustrates an exemplary embodiment of a method of making a stiffened panel.

FIG. 10 illustrates an exemplary embodiment of a method 400 of making the shaped composite stringers. Of course, other methods may also be used. In this instance, an OML tool is used. In process 410, a determination is made about stringer spacing and location on the skin panel, wing, fuselage or other component to be stiffened with stringers. Once a determination has been made, the component is laid down on the OML tool, in process 420. Bladders or mandrels in the shape of the stringer are then laid on the component at predetermined positions and intervals, in process 430. A tape lay up (or other composite fiber lay up) is then prepared in process 440. The tape lay up may have a series of oriented stacked layers and the tape may be pre-impregnated with a suitable resin, such as epoxy resin. The tape lay up is laid over the bladder or mandrel, in process 450. At this point, the assembly of component, bladder or mandrel, and tape lay up is bagged within a vacuum bag, in process 460. A vacuum is pulled on the bag, and the tape lay up is consolidated to the component, in process 470. Typical temperature may be about 350° F. for a typical epoxy resin matrix, and pressure may be about 85 psi. Other temperature and pressure conditions may apply to other resins. Generally, but not necessarily, the resin of the panel and of the stringer is the same. Accordingly, during consolidation the resin of the stringer and the resin of the panel are concurrently cured or "co-cured." This facilitates formation of a strong bond between the stringer and the panel as resin flows and consolidates into a matrix in the attachment zone includes both panel and stringer fillers. After consolidation, the bag is removed, in process 480. The stringer is now consolidated with the component. In the exemplary process, the flexible draped tape forms a smoothly curved stringer thereby minimizing the possibility of structural issues in the stringer. The stringer is free of tight radius curves or abrupt bends and has smooth, continuous, wide-radius curves. Further in some exemplary embodiments, the use of caul panels or caul sheets is not required. This eliminates the costs associated with using these devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof. For example, the stringers could be cured in a separate operation and bonded to the skin with adhesive in a secondary operation.

What is claimed is:

1. A method for fabricating a composite stringer on a composite panel, the method comprising the steps of:
   placing a form on a first surface of the composite panel;
   draping a composite material over the form so as to form a lay up;
   enclosing the composite panel and lay up-covered form with a vacuum bag; and
   consolidating the lay up to the composite panel so as to form a stringer wherein the stringer is characterized by a profile having a first stringer side and a second stringer side, wherein the first stringer side extends from a stringer top to a first stringer leg and a second stringer side extends from the stringer top to a second stringer leg, the first stringer side and second stringer side each extending in a continuous curve from the stringer top to a respective stringer leg and wherein the curve of each stringer side is characterized by at least one inflection point such that the curve of each stringer side is characterized by at least a first convex section and at least a first concave section.

2. The method according to claim 1 further comprising the step of positioning a second surface of the composite panel on a mold tool.

3. The method according to claim 1, wherein the step of consolidating the lay up to the composite panel further comprises consolidating with heat and pressure.

4. The method according to claim 1, wherein the composite material comprises tape.

5. The method according to claim 1, wherein the composite material comprises woven fabric.

6. The method according to claim 1, wherein the form is one of a bladder or a mandrel.

7. The method according to claim 6 further comprising the step of inflating and deflating the bladder.

8. The method according to claim 1 further comprising the step of determining a location and spacing of stringers on the composite panel.

9. The method according to claim 1, wherein the step of consolidating further comprises consolidating a footing of the composite material with the composite panel.

10. The method according to claim 1 excluding a step of preforming the stringer.

11. A method for fabricating a composite stringer on a composite panel, the method comprising the steps of:
positioning a first surface of the composite panel on a mold tool;
placing a form on a second surface of the composite panel, wherein the form is one of a bladder or a mandrel;
draping a composite material over the form so as to form a lay up;
enclosing the composite panel and lay up-covered forms with a vacuum bag; and
consolidating the lay up to the composite panel with heat and pressure so as to form a stringer wherein the stringer is characterized by a profile having a first stringer side and a second stringer side, wherein the first stringer side extends from a stringer top to a first stringer leg and a second stringer side extends from the stringer top to a second stringer leg, the first stringer side and second stringer side each extending in a continuous curve from the stringer top to a respective stringer leg and wherein the curve of each stringer side is characterized by at least one inflection point such that the curve of each stringer side is characterized by at least a first convex section and at least a first concave section.

12. The method according to claim 11, wherein the stringer is characterized by an attachment zone comprising a portion of the stringer and a portion of the panel comprising a stringer point of attachment to the panel, the attachment zone also comprising cured resin.

13. The method according to claim 11, wherein the lay up comprises a plurality of tape plies, wherein each tape ply in the plurality of tape plies is characterized by an orientation, and wherein the plurality of tape plies comprise different orientations.

14. The method according to claim 11, wherein a stringer side is characterized by a substantially flat top and a curve that extends from the top to the panel with a tangent to the curve at the inflection point set at an angle of substantially 90 degrees to the panel.

15. The method according to claim 11, wherein the stringer side is characterized by a curve that extends downward to the panel with a tangent to the curve at the inflection point set at an angle to the panel wherein the angle is between about 35 to about 65 degrees.

16. A method of fabricating a composite panel with a composite stringer, the method comprising:
determining location and spacing of stringers on a composite panel;
positioning the composite panel on a mold tool;
laying down on the composite panel, at determined locations and spacing, forms conforming to a shape of the stringers to be formed;
preparing lay ups of composite material for forming into stringers;
laying a prepared lay up of composite material over each of the forms;
enclosing at least the composite panel and lay up-covered forms with a vacuum bag; and
consolidating the stringers to the composite panel under heat and pressure so as to produce a stiffened composite panel, wherein the stringer is characterized by a profile having a first stringer side and a second stringer side, wherein the first stringer side extends from a stringer top to a first stringer leg and a second stringer side extends from the stringer top to a second stringer leg, the first stringer side and second stringer side each extending in a continuous curve from the stringer top to a respective stringer leg and wherein the curve of each stringer side is characterized by at least one inflection point such that the curve of each stringer side is characterized by at least a first convex section and at least a first concave section.

17. The method of claim 16, wherein the step of positioning comprises positioning in an outside mold line tool.

18. The method of claim 16, wherein the step of consolidating comprises forming an attachment zone substantially free of composite fibers separated from and protruding from fibrous material of the stringer, and substantially free of excess resin.

\* \* \* \* \*